(12) United States Patent
Hale

(10) Patent No.: US 8,413,343 B2
(45) Date of Patent: Apr. 9, 2013

(54) EXTENDABLE PLUMB AND LEVEL MEASURING DEVICE AND ASSOCIATED USAGE METHOD

(76) Inventor: Brian K. Hale, Monroe, NC (US)

( * ) Notice: Subject to any disclaimer, the term of this patent is extended or adjusted under 35 U.S.C. 154(b) by 68 days.

(21) Appl. No.: 12/260,421

(22) Filed: Oct. 29, 2008

(65) Prior Publication Data

US 2009/0113733 A1 May 7, 2009

Related U.S. Application Data

(60) Provisional application No. 60/985,494, filed on Nov. 5, 2007.

(51) Int. Cl.
*G01C 9/26* (2006.01)
*G01C 9/00* (2006.01)

(52) U.S. Cl.
USPC ................................. 33/375; 33/374; 33/365

(58) Field of Classification Search .................... 33/365, 33/374, 375, 376, 379, 381, 383, 384
See application file for complete search history.

(56) References Cited

U.S. PATENT DOCUMENTS

| | | | | | |
|---|---|---|---|---|---|
| 143,942 | A | * | 10/1873 | Thornley | 33/375 |
| 455,644 | A | * | 7/1891 | Sloane | 33/813 |
| 596,279 | A | * | 12/1897 | Potter | 33/375 |
| 902,493 | A | * | 10/1908 | Jaques, Jr. | 33/813 |
| 986,924 | A | * | 3/1911 | L'Heureux | 33/375 |
| 1,187,548 | A | * | 6/1916 | Purer | 33/375 |
| 1,221,644 | A | * | 4/1917 | Woods | 33/375 |
| 1,305,636 | A | * | 6/1919 | Weilep | 33/375 |
| 1,494,722 | A | * | 5/1924 | Tingstrom et al. | 33/341 |
| 2,162,602 | A | * | 6/1939 | Black | 33/375 |
| 2,520,700 | A | * | 8/1950 | Thorndike | 33/375 |
| 2,521,525 | A | * | 9/1950 | Krausser | 33/375 |
| 2,743,528 | A | * | 5/1956 | Posthauer, Sr. | 33/375 |
| 2,746,164 | A | * | 5/1956 | Eitzen | 33/375 |
| 3,104,477 | A | * | 9/1963 | Edwill | 33/374 |
| 3,169,324 | A | * | 2/1965 | Heinz | 33/375 |
| 3,648,378 | A | * | 3/1972 | Thingstad et al. | 33/374 |
| 3,766,656 | A | * | 10/1973 | Westphal | 33/265 |
| 4,607,437 | A | * | 8/1986 | McSorley et al. | 33/374 |
| 4,928,395 | A | * | 5/1990 | Good | 33/374 |
| 5,111,589 | A | * | 5/1992 | Tate | 33/385 |

(Continued)

FOREIGN PATENT DOCUMENTS

DE 10010921 A1 * 9/2001
EP 862047 A2 * 9/1998

(Continued)

*Primary Examiner* — R. A. Smith
(74) *Attorney, Agent, or Firm* — Clements Bernard PLLC; Lawrence A. Baratta, Jr.; Christopher L. Bernard

(57) ABSTRACT

The present disclosure includes an extendable plumb and level measuring device and associated usage method. The device can utilize interconnected members including a first, a second, and a third member. For example, the third member can be slidingly disposed within the first and second members to extend the device to a set and arbitrary length. The measuring device utilizes a spirit level or digital reader to determine when the device itself is level responsive to positioning a extendable stopper against a construction, such as a wall, door, panel, and the like. Once level, a measuring device, such as a ruler, disposed within the device can be utilized to measure the plumb of the construction. Additionally, the device can function as an extendable level to measure an arbitrary length.

13 Claims, 15 Drawing Sheets

U.S. PATENT DOCUMENTS

| | | | | |
|---|---|---|---|---|
| 5,412,875 | A | * | 5/1995 | Hilderbrandt ............ 33/374 |
| 5,495,784 | A | * | 3/1996 | Chen .................... 83/471.2 |
| 5,617,641 | A | * | 4/1997 | Aarhus .................... 33/374 |
| 5,784,794 | A | * | 7/1998 | Nelson ................ 33/366.14 |
| 6,041,510 | A | * | 3/2000 | Huff ........................ 33/374 |
| 6,293,023 | B1 | * | 9/2001 | Schooley ................ 33/374 |
| 6,430,824 | B1 | * | 8/2002 | Smith ...................... 33/286 |
| 2002/0116833 | A1 | * | 8/2002 | Hollenbeck ............ 33/374 |
| 2005/0092889 | A1 | * | 5/2005 | Pence .................... 248/351 |
| 2006/0064888 | A1 | * | 3/2006 | Chen ...................... 33/365 |
| 2008/0189967 | A1 | * | 8/2008 | Tosa ...................... 33/390 |
| 2010/0050449 | A1 | * | 3/2010 | Ilton ...................... 33/301 |
| 2011/0107609 | A1 | * | 5/2011 | Heyer .................... 33/374 |

FOREIGN PATENT DOCUMENTS

| | | | |
|---|---|---|---|
| GB | 2190745 A | * | 11/1987 |
| GB | 2226406 A | * | 6/1990 |
| GB | 2276451 A | * | 9/1994 |
| GB | 2306647 A | * | 5/1997 |
| JP | 05026668 | * | 2/1993 |
| JP | 09145365 A | * | 6/1997 |

* cited by examiner

EXTENDABLE PLUMB AND LEVEL MEASURING DEVICE AND ASSOCIATED USAGE METHOD

CROSS-REFERENCE TO RELATED APPLICATION(S)

The present utility patent application claims priority to U.S. Provisional Patent Application No. 60/985,494 filed Nov. 5, 2007, and entitled "EXTENDABLE PLUMB LEVEL DEVICE AND ASSOCIATED USAGE METHOD," which is incorporated in full by reference herein.

FIELD OF THE INVENTION

The present invention relates generally to a plumb and level measuring, and more particularly, to a plumb and level measuring device that is selectively extendable to allow for measuring plumb and level associated with walls, doors, glass shower panels, and the like as well as an associated usage method.

BACKGROUND OF THE INVENTION

In construction of walls, doors, glass panels, and the like, it is important to ensure the construction is "plumb" which means perfectly upright. Conventional spirit levels or bubble levels are instruments designed to indicate whether a surface is level or plumb. Different types of spirit levels are used by carpenters, bricklayers, other building trades workers, surveyors, and the like.

With regard to installing walls, doors, panels, etc., it is difficult to measure plumb. One conventional mechanism is to utilize a plumb bob. However, this is not an efficient mechanism. Conventional levels, such as laser devices, are useful for measuring whether a horizontal structure is level, but not with measuring plumb on a vertical structure. Thus, it would be useful to have an extendable plumb/level device to measure plumb associated with walls, doors, panels, etc.

Determining the amount of plumb is of particular importance when installing doors, walls, glass plates, and the like. For example, in one particular application, glass walls are installed to fit within tile walls for bathroom showers. Traditionally, tile walls are rarely installed plumb. Disadvantageously, there does not exist a conventional mechanism to determine the amount of plumb efficiently since these tile walls are a variable distance. For example, a tile wall can extend from a floor to a ceiling for the shower. There are no conventional mechanisms to quickly and accurately measure the plumb associated with the tile wall to ensure the glass wall is cut exactly to form to fit within the tile wall.

BRIEF SUMMARY OF THE INVENTION

In various exemplary embodiments, the present invention is an extendable plumb and level measuring device and associated usage method. The device can utilize interconnected members including a first, a second, and a third member. For example, the third member can be slidingly disposed within the first and second members to extend the device to a set and arbitrary length. The measuring device utilizes a spirit level or digital reader to determine when the device itself is level responsive to positioning a extendable stopper against a construction, such as a wall, door, panel, and the like. Once level, a measuring device, such as a ruler, disposed within the device can be utilized to measure the plumb of the construction. Additionally, the device can function as an extendable level to measure an arbitrary length. In one exemplary embodiment, the present invention can be utilized to measure plumb associated with glass panels, such as in a glass shower. Other uses are also contemplated. The plumb measuring device can be extended to any length responsive to the third member length.

In an exemplary embodiment of the present invention, an extendable plumb and level measuring device includes interconnected elongated members with a first member, a second member, and a third member; an adjustable positioning device at one end of the first member, the positioning device including a handle and a stopper; a level measuring device disposed at the one end of the first member; and a measuring device coupled to the one end of the first member. The extendable plumb and level measuring device can further include a securing mechanism to fixedly secure the first member, the second member, and the third member in a desired position; wherein the third member is slidingly disposed within the first member and the second member. The handle can be attached to a threaded rod and the threaded rod is attached to the stopper; wherein the threaded rod is disposed through the first member. Optionally, the handle and the threaded rod includes a telescopic configuration. The extendable plumb and level measuring device is positioned against a construction to measure plumb; wherein the handle is rotated to position the stopper until the level measuring device determines the extendable plumb and level measuring device is level; and wherein when the extendable plumb and level measuring device is level, the measuring device is utilized to determine an amount of plumb associated with the construction. Optionally, the level measuring device includes a spirit bubble in a glass tube with vertical guide lines; and wherein the glass tube is calibratable within the first member through a plurality of adjustable screws. Alternatively, the level measuring device includes a digital level; wherein the digital level is removable from the first member. The measuring device can include a ruler slidingly disposed in the one end of the first member. Each of the first member and the second member can include a plurality of holes. The extendable plumb and level measuring device optionally further includes a second level measuring device disposed within the third member, wherein the second level measuring device is utilized to measure level of a construction.

In another exemplary embodiment of the present invention, a plumb measuring method includes determining length of a construction in which plumb is being measured; extending a plumb measuring device responsive to the length; placing the plumb measuring device against the construction; adjusting a first positioning device at the first member until a level measuring device indicates level; and measuring plumb associated with the construction with the plumb measuring device. Optionally, the construction includes a bathroom wall receiving a glass plate for a shower, and wherein the plumb measuring method further includes cutting a glass plate responsive to the measured plumb. The extending step can include extending a sliding member slidingly disposed within a first member and a second member; and securing the sliding member in a desired position. The adjusting step can include rotating a handle to move a stopper disposed to a threaded rod disposed to the handle to move the plumb measuring device at an angle relative to the construction; and continuing the rotating step until the device is level. The measuring step can include sliding a ruler coupled to the plumb measuring device out to the construction; and reading a value on the ruler indicative of an amount of plumb. Optionally, the plumb measuring method further includes calibrating the level measuring device relative to the plumb measuring device.

In yet another exemplary embodiment of the present invention, a plumb and level measuring device includes an adjustable elongated member; a positioning device disposed at one end of the adjustable elongated member, wherein the positioning device is operable to angularly move the adjustable elongated member relative to an adjacent construction; a calibratable level measuring device disposed at the one end operable to determine when the adjustable elongated member is level; and a distance measuring device coupled to the one end operable to measure a distance between the adjacent construction and the adjustable elongated member, wherein the distance includes an amount of plumb from the one end of the adjustable elongated member corresponding to a point on the adjacent construction relative to another end of the adjustable elongated member corresponding to a second point on the adjacent construction. The adjustable elongated member can include a first elongated member; a second elongated member; a third elongated member slidingly disposed within the first elongated member and the second elongated member; and a securing mechanism to lock the third elongated member in a desired position relative to the first elongated member and the second elongated member. Optionally, the calibratable level measuring device includes one of a spirit bubble in a glass tube with vertical guide lines and a removable digital level meter. The positioning device can include a stopper movably disposed within the adjustable elongated member; and adjustment means to move the stopper to move the adjustable elongated member away from the adjacent construction such that the adjustable elongated member is level.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention is an extendable plumb and level measuring device and associated usage method. The device can utilize interconnected members including a first, a second, and a third member. For example, the third member can be slidingly disposed within the first and second members to extend the device to a set and arbitrary length. The measuring device utilizes a spirit level or digital reader to determine when the device itself is level responsive to positioning a extendable stopper against a construction, such as a wall, door, panel, and the like. Once level, a measuring device, such as a ruler, disposed within the device can be utilized to measure the plumb of the construction. Additionally, the device can function as an extendable level to measure an arbitrary length.

In one exemplary embodiment, the present invention can be utilized to measure plumb associated with glass panels, such as in a glass shower. Other uses are also contemplated as will be recognized by those of ordinary skill in the art. The plumb and level measuring device can be extended to any length responsive to the lengths of the associated members.

Figure 1A:
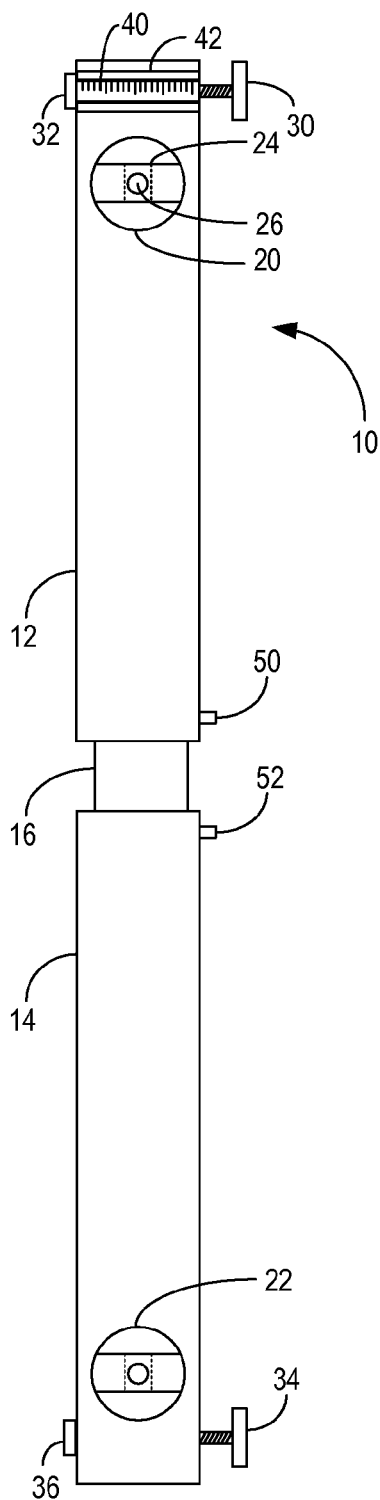
FIGS. 1a and 1b illustrate an extendable plumb measuring device according to an exemplary embodiment of the present invention.
Figure 1B:
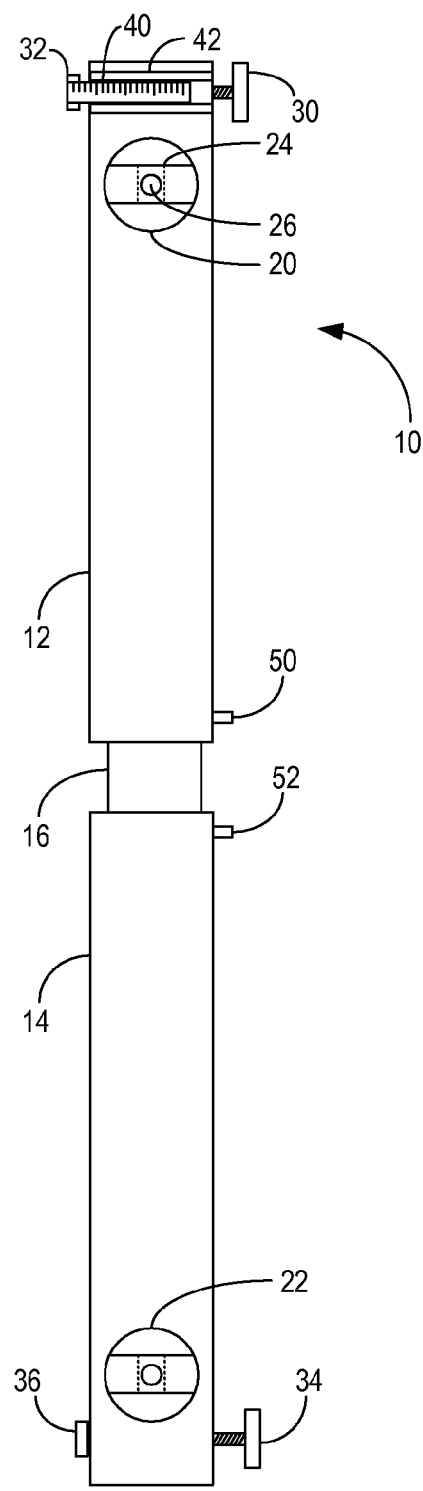

Referring to FIGS. 1a and 1b, an extendable plumb and level measuring device 10 is illustrated, according to an exemplary embodiment of the present invention. The plumb and level measuring device 10 includes first and second elongated members 12, 14 interconnected with a sliding member 16. Each of the members 12, 14, 16 includes a rigid construction, and can include steel, aluminum, plastic, or the like. The sliding member 16 is slidingly disposed and selectively securable within each of the first and second members 12, 14. For example, the first and second members 12, 14 can include a hollow interior in which the sliding member 16 is slidingly disposed.

A circular opening 20 is positioned at one end of the first member 12, and optionally, a circular opening 22 is positioned at an end of the second member 14. The opening 20 includes a glass tube 24 with a spirit 26. The glass tube 24 can be filled with alcohol or another similar fluid and a small air bubble, i.e., the spirit 26. The glass tube 24 includes two vertical guide lines. The position of the spirit 26 relative to the vertical guide lines indicates whether the device 10 is horizontal. The glass tube 24 and spirit 26 can include a conventional spirit bubble as is known in the art for determining level. Optionally, the opening 22 can also include a glass tube and spirit bubble as well.

The plumb and level measuring device 10 is configured to be placed vertically against a construction, i.e. wall, panel, door, glass, etc to measure plumb or horizontally on a construction to measure level. A handle 30 is located at the one end of the first member 12, i.e., the same end as the opening 20. The handle 30 is attached to a screw which is slidingly disposed through the first member 14 from the handle 30 to an extendable stopper 32. The stopper 32 is configured to be positioned at one end of the construction. Additionally, the device 10 can include a second handle 34 and stopper 36 at the one end of the second member 14.

FIG. 1a illustrates the device 10 where the handles 30, 34 are positioned for a construction which is perfectly plumb, i.e., both extendable stoppers 32, 36 do not extend from their respective positions in the members 12, 14. FIG. 1b illustrates the device 10 where the handle 30 has been adjusted to position the stopper 32 against a top portion of the construction which is not perfectly plumb. Here, the handle 30 is turned to move the screw and the stopper 32 against the construction until the spirit 26 is aligned to the vertical guide lines.

The device 10 includes a measuring device 40 slidingly disposed within guide rails 42 at the one end of the first member 12. The measuring device 40 is operable to measure the amount of plumb of a construction. The measuring device 40 can include a sliding ruler or the like. Note, the one end of the second member 14 can also include a measuring device (not shown). Alternatively, the device 10 can be utilized with either member 12, 14 at the top or bottom of the construction, depending on the direction of any errors with the plumb of the construction. For example, the members 12, 14 can be oriented in either direction by rotating the device 10.

Figure 2A:
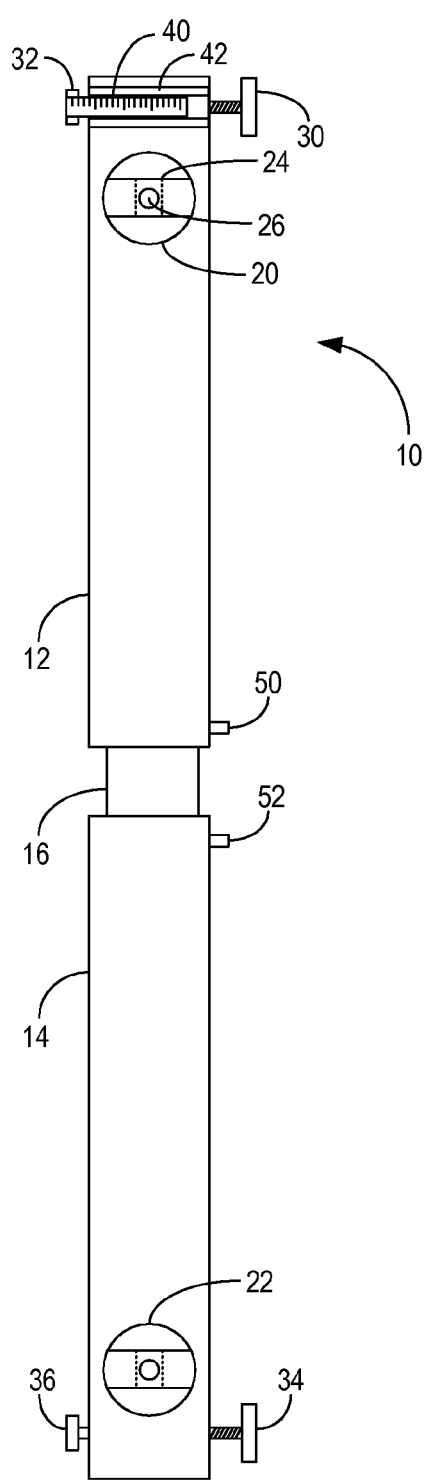
FIGS. 2a and 2b illustrate an extension of the plumb measuring device according to an exemplary embodiment of the present invention.
Figure 2B:
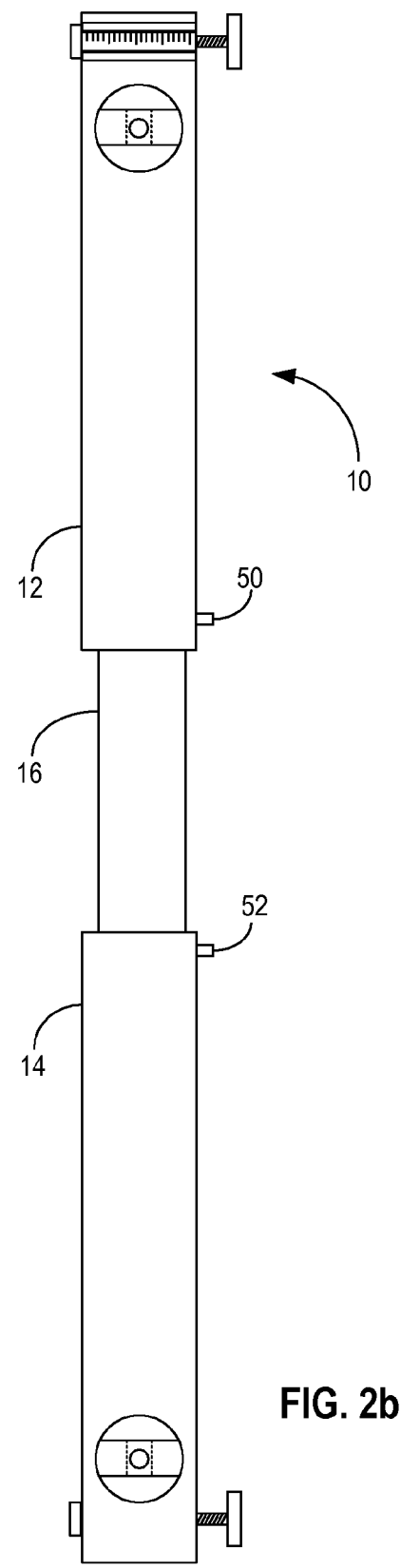

Referring to FIGS. 2a and 2b, an extension of the plumb and level measuring device 10 is illustrated, according to an exemplary embodiment of the present invention. As described herein, the member 16 is configured to slide within the members 12, 14. Of note, each of the members 12, 14, 16 is of a rigid construction. The length of the device 10 is adjustable through securing pins 50,52 which can be released, removed, relaxed, etc. allowing the third member 16 to slide within either member 12, 14 or both. The pins 50, 52 can also include screws, pins, or the like. For example, the pins 50, 52 can be configured to fit into one or a plurality of holes within the member 16 or as screws which exert pressure between the members 12, 14, 16 to lock the members 12, 14, 16 in place at a desired length.

The present invention contemplates arbitrary lengths for each of the members 12, 14, 16 to allow measurement of large constructions. For example, the member 16 can be selectively removable from the members 12, 14, allowing for varying lengths to be utilized for the member 16 to provide further extendability of the device 10. For example, the third member 16 can be replaced with a longer third member 16.

Figure 3A:
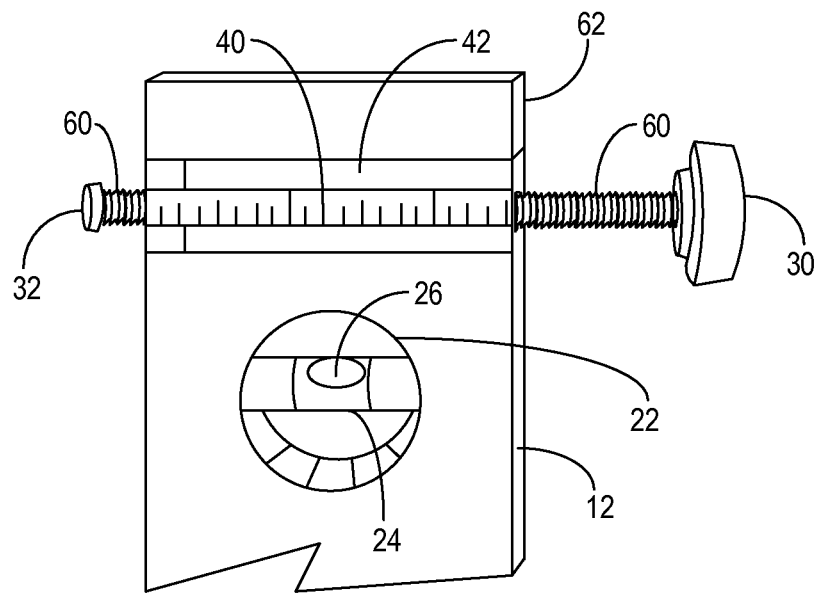
FIGS. 3a and 3b illustrate an exemplary operation of the plumb measuring device showing the action on the one end of the first member, according to an exemplary embodiment of the present invention.
Figure 3B:
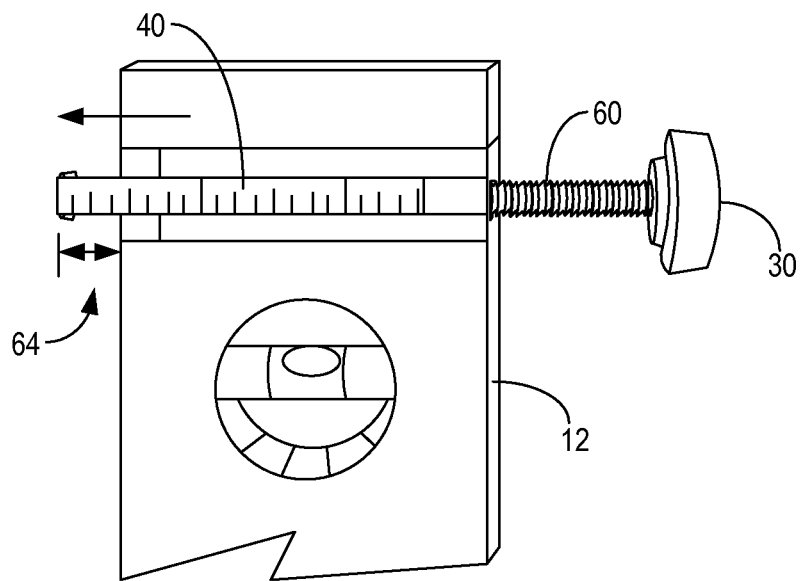

Referring to FIGS. 3a and 3b, an exemplary operation of the plumb and level measuring device 10 is illustrated showing the one end of the first member 12, according to an exemplary embodiment of the present invention. The handle 30 is connected to a rod 60 that extends through the first member 12 and is connected to the stopper 32 at the other side. For example, the rod 60 can include a threaded rod which can turn responsive to rotational motion on the handle 30.

The plumb and level measuring device 10 is positioned vertically against a construction. Optionally, the first and second member 12, 14 can include a rubber portion 62 to prevent damage or scratching on the construction or the adjoining walls or surfaces. The handle 30 is turned to move the stopper 32 while the stopper 32 is positioned against the construction. As the rod 60 moves the stopper 32, a user visually monitors the spirit 26 to determine when it is within the guide lines on the glass tube 24, indicating the device 10 is in a level position as shown in FIG. 3a.

Once the plumb and level measuring device 10 is visually determined to be level, the measuring device 40 can be slid out of the guide rails 42 to determine the amount of plumb at the one end of the member 12. For example, in FIG. 3b, the amount of plumb at this end of the member 12 is shown as distance 64.

Figure 4:
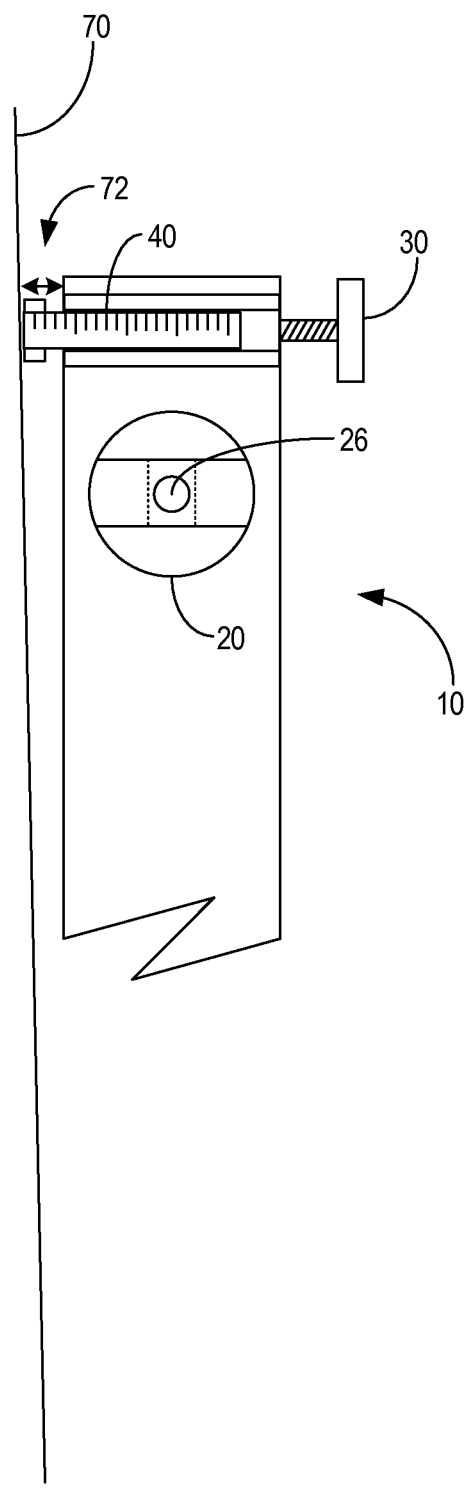
FIG. 4 illustrates another exemplary operation of the plumb measuring device against a wall according to an exemplary embodiment of the present invention.

Referring to FIG. 4, another exemplary operation of the plumb and level measuring device 10 is illustrated against a construction 70 according to an exemplary embodiment of the present invention. Here, the plumb and level measuring device 10 is utilized to determine that the construction 70 is plumb by a distance 72, as measured by the measuring device 40 once the spirit 26 is aligned to the guide rails based on positioning of the handle 30. The measuring device 40 can include Metric or US-based units, or both. Further, the measuring device 40 can include a ruler set to any granularity of measurement, such as $\frac{1}{16}$" or $\frac{1}{32}$" increments. Advantageously, the device 10 enables a quick and accurate measure of the plumb associated with the construction 70.

Figure 5:
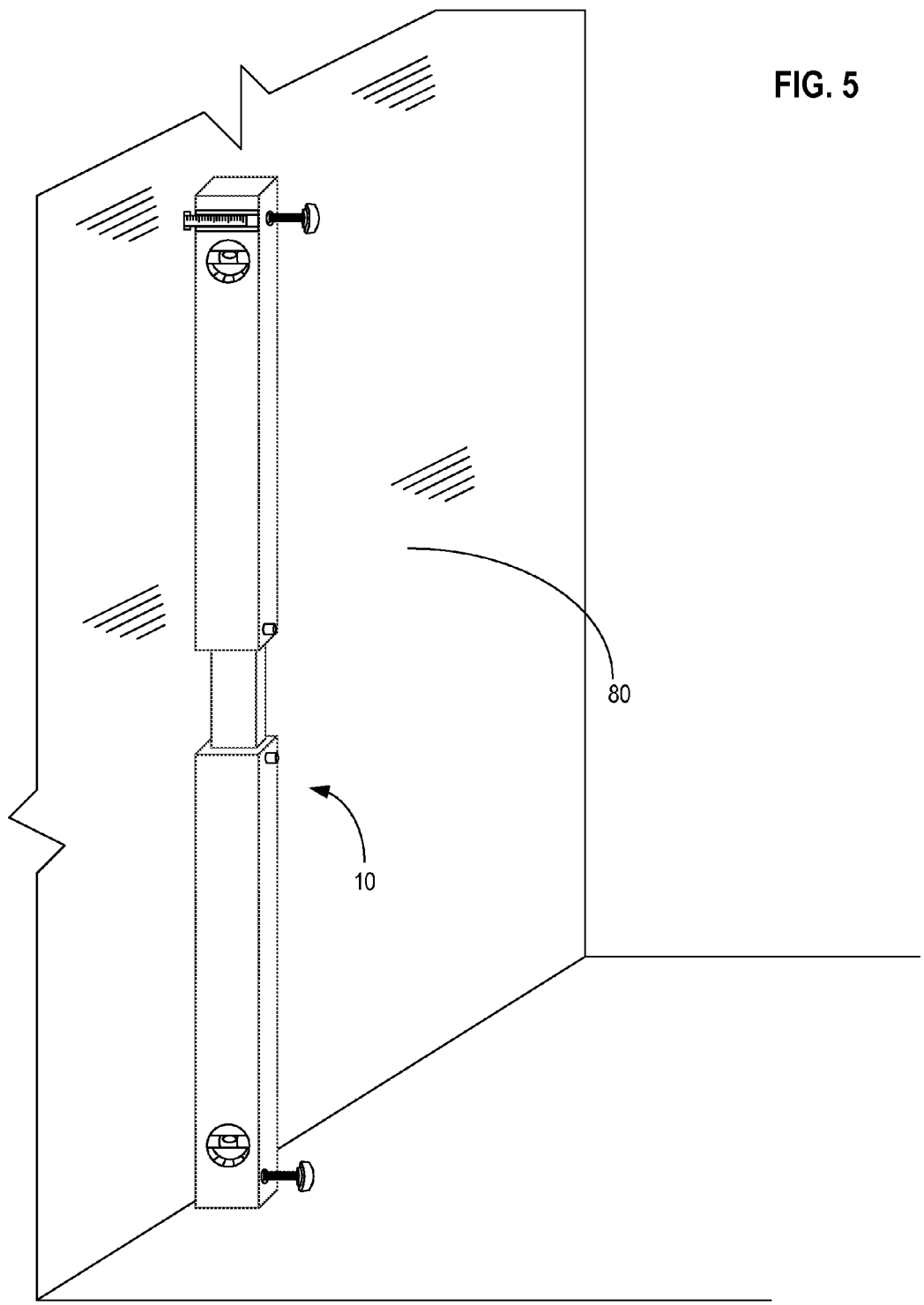
FIG. 5 illustrates an exemplary operation of the plumb measuring device for measuring plumb associated with glass panels according to an exemplary embodiment of the present invention.

FIG. 5 illustrates an exemplary operation of the plumb and level measuring device 10 for measuring plumb associated with glass panels fit within a tile wall 80 according to an exemplary embodiment of the present invention. One exemplary application of the plumb and level measuring device 10 can include measuring plumb associated with the wall for glass panel installation, e.g., for glass showers or the like. For example, tile walls 80 are rarely installed completely plumb. When installing glass walls for showers, this potentially leads to excess open space at one end of the tile wall 80. Traditionally, caulk is used to close this open space. Disadvantageously, the caulk takes away from the aesthetic value of a glass wall and creates a potential leak point. The plumb and level measuring device 10 can be used to determine how much plumb is located in the tile wall 80, allowing for a glass wall to be cut to shape.

Traditionally, measuring for plumb on the wall 80 was time consuming, costly, and/or error prone. The traditionally process generally involved using a laser level and measuring the plumb. However, this can lead to errors in failing to account for the laser position in the measurement as well as being costly. Advantageously, the plumb and level measuring device 10 is efficient, low-cost versus laser mechanisms, and accurate. The plumb and level measuring device 10 can significantly reduce measurement time, e.g. beyond half as much time as traditional mechanisms. Also, the plumb and level measuring device 10 significantly reduces errors as the measuring device 40 is set to measure the exact amount of plumb without requiring additional calculations, e.g. taking into account the width of a laser level off the calculation.

Figure 6:
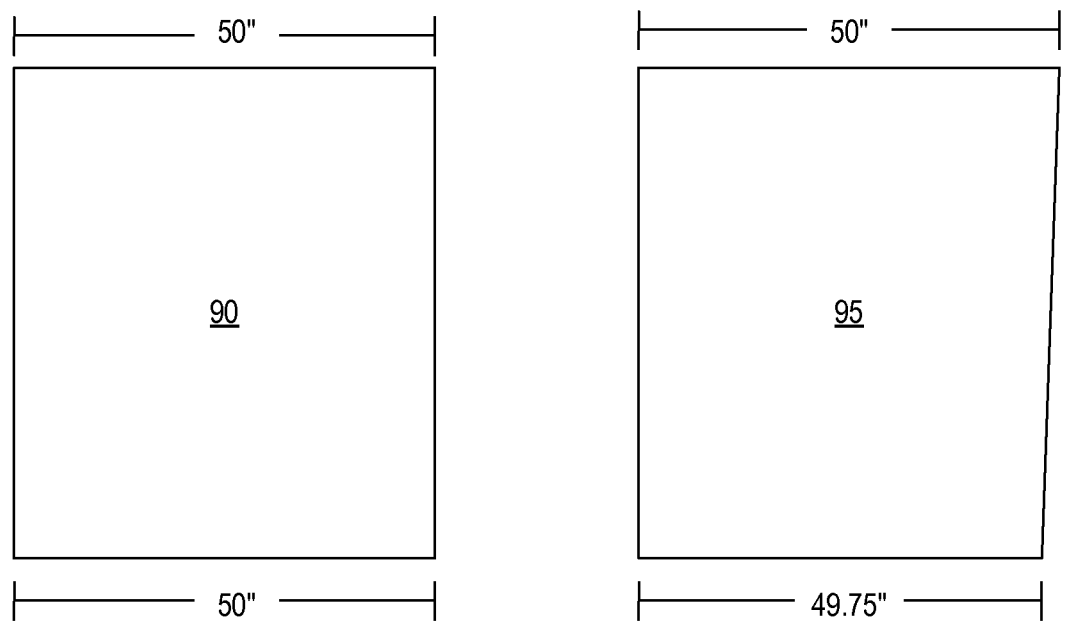
FIG. 6 illustrates an exemplary application of the plumb measuring device for determining to amount of plumb to allow a glass plate to be cut exactly to form.

Referring to FIG. 6, two glass plates 90, 95 are illustrated according to an exemplary application of the present invention. The glass plate 90 is shown without any adjustment for plumb, i.e. it is 50" at a top and a bottom. The glass plate 95, however, is shown cut to a reduced length of 49.75" at the bottom. For example, this measurement could be determined using the measuring device 40 and the plumb and level measuring device 10 to determine that the ultimate structure where the plate 95 is being installed is not perfectly plumb, and has a 0.25" extension at a bottom point.

Advantageously, the plumb and level measuring device 10 enables an installer to quickly and accurately determine the amount of inaccuracy in plumb for a variety of applications. This enables doors, walls, glass plates, etc. to be manufactured or cut to exact dimensions. For example, testing has shown the plumb measuring device 10 can be accurate to beyond $\frac{1}{32}^{nd}$ of an inch in measuring inaccuracies over an extended length.

Figure 7:
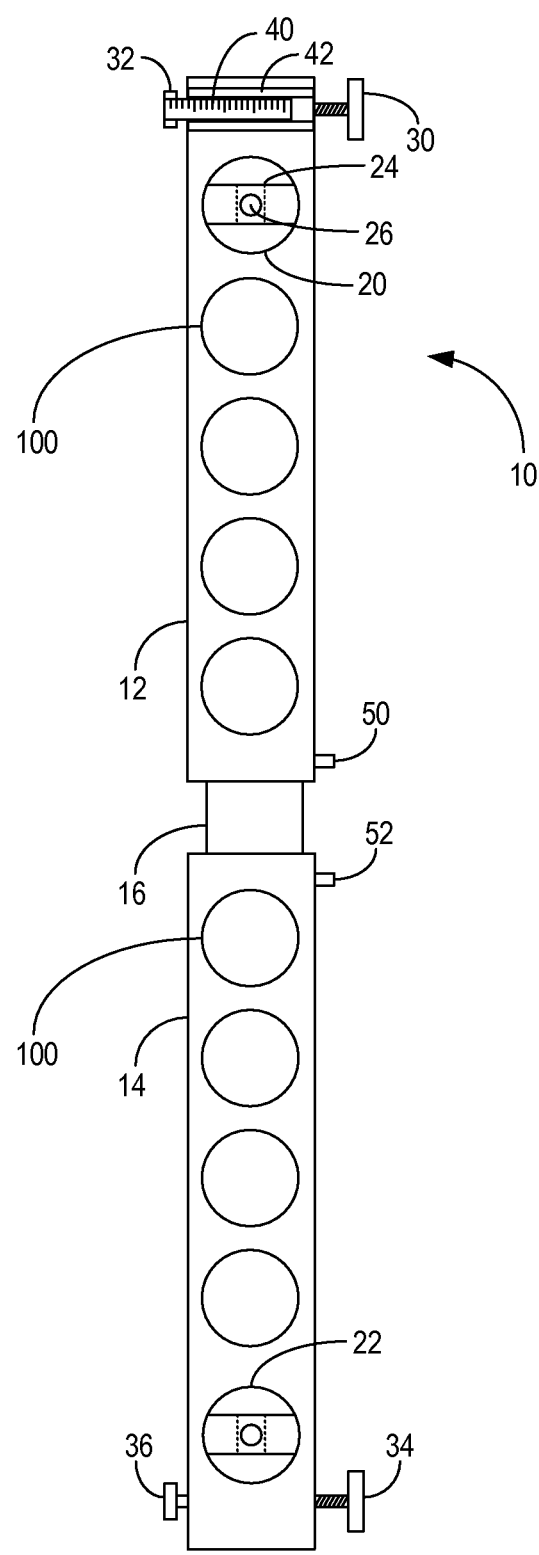
FIG. 7 illustrates the extendable plumb measuring device of FIG. 1 with a plurality of holes in each of the members according to an exemplary embodiment of the present invention.

Referring to FIG. 7, the extendable plumb and level measuring device 10 is illustrated with a plurality of holes 100 in each of the members 12, 14, according to an exemplary embodiment of the present invention. The plurality of holes 100 reduces the weight of the members 12, 14 while preserving the rigidity of the members 12, 14. For example, if the plumb and level measuring device 10 is constructed from steel or the like, the plumb and level measuring device 10 can be a significant weight, especially at a length of 6 feet or more. Advantageously, the plurality of holes 100 provides a user less weight for carrying the device 10 while preserving the functionality of the device 10.

Figure 8A:
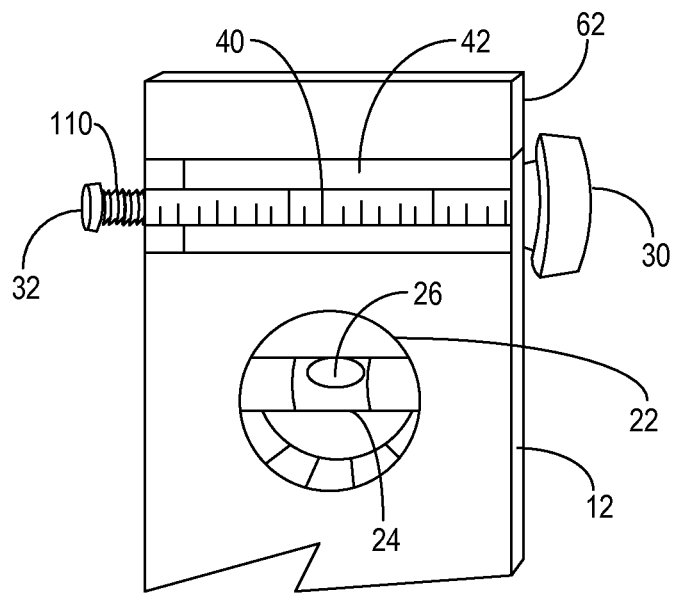
FIGS. 8a and 8b illustrates a telescopic rod and a measuring device internal to the member according to an exemplary embodiment of the present invention.
Figure 8B:
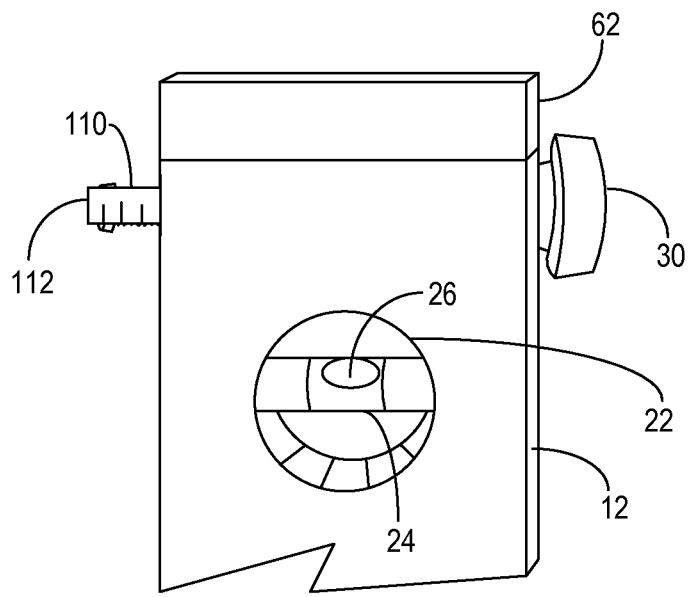

Referring to FIGS. 8a and 8b, a telescopic rod 110 and a measuring device 112 internal to the member 12 are illustrated according to an exemplary embodiment of the present invention. The telescopic rod 110 and the internal measuring device 112 are optional enhancements for the plumb and level measuring device 10. In FIG. 8a, the telescopic rod 110 is illustrated attached to the handle 30. The telescopic rod 110 is similar to the threaded rod 60 in FIG. 3, and is attached to the handle 30 and the stopper 32. The telescopic rod 110 extends through the member 12, but rotational motion on the handle 30 does not extend the handle 30 from the member 12. Advantageously, the handle 30 remains disposed to the member 12.

In FIG. 8b, the measuring device 112 is disposed within the member 12. For example, the member 12 can include a hollow interior at the end in which the measuring device 112 is situated. Here, the measuring device 112 is configured to slid out from within the member 12 to take the plumb measurement once the spirit 26 is determined to be level.

Figure 9:
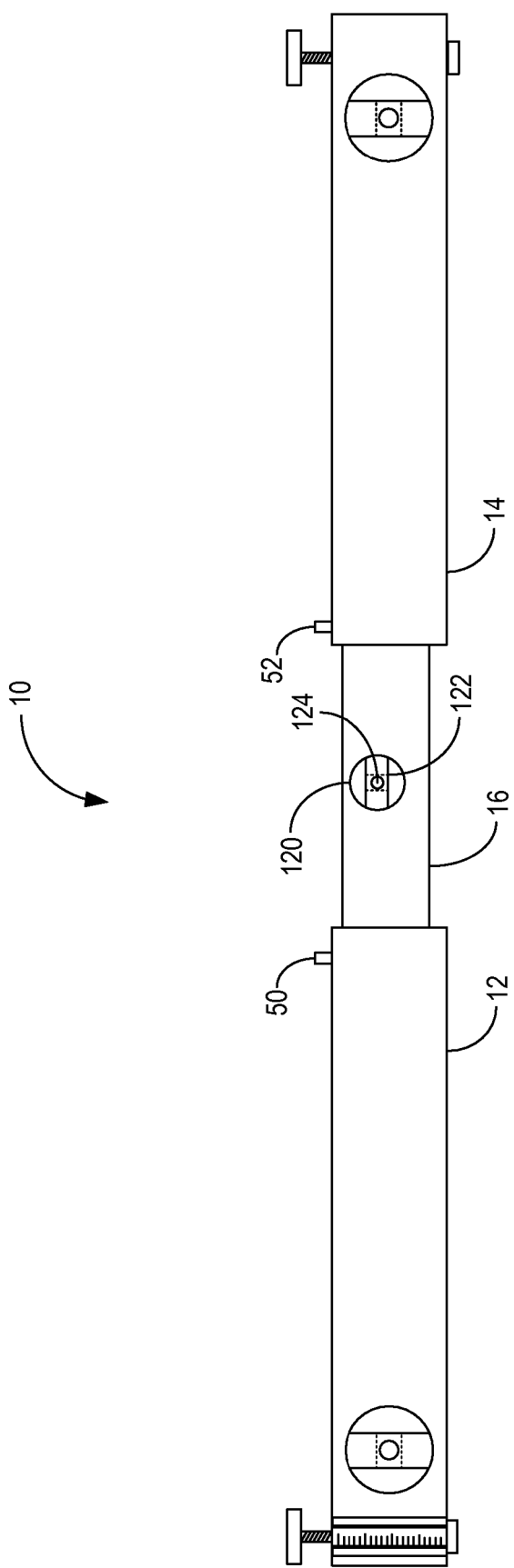
FIG. 9 illustrates the plumb and level measuring device utilized as a extendable length level according to an exemplary embodiment of the present invention.

Referring to FIG. 9, the plumb and level measuring device 10 can also be utilized as a extendable length level according to an exemplary embodiment of the present invention. The member 16 can include an opening 120 with a glass tube 122 and a spirit 124. The glass tube 122 and the spirit 124 operate similarly to the glass tube 24 and the spirit 26. Specifically, the glass tube 122 includes vertical guide lines to visually determine when the spirit 124 is located in a level position. Additionally, the measuring devices located on the members 12, 14 can be utilized to measure how much a construction is not level in a similar fashion as the plumb measurement described herein. Advantageously, the extendable length of the device 10 can provide level measurements across large or small constructions.

Figure 10:
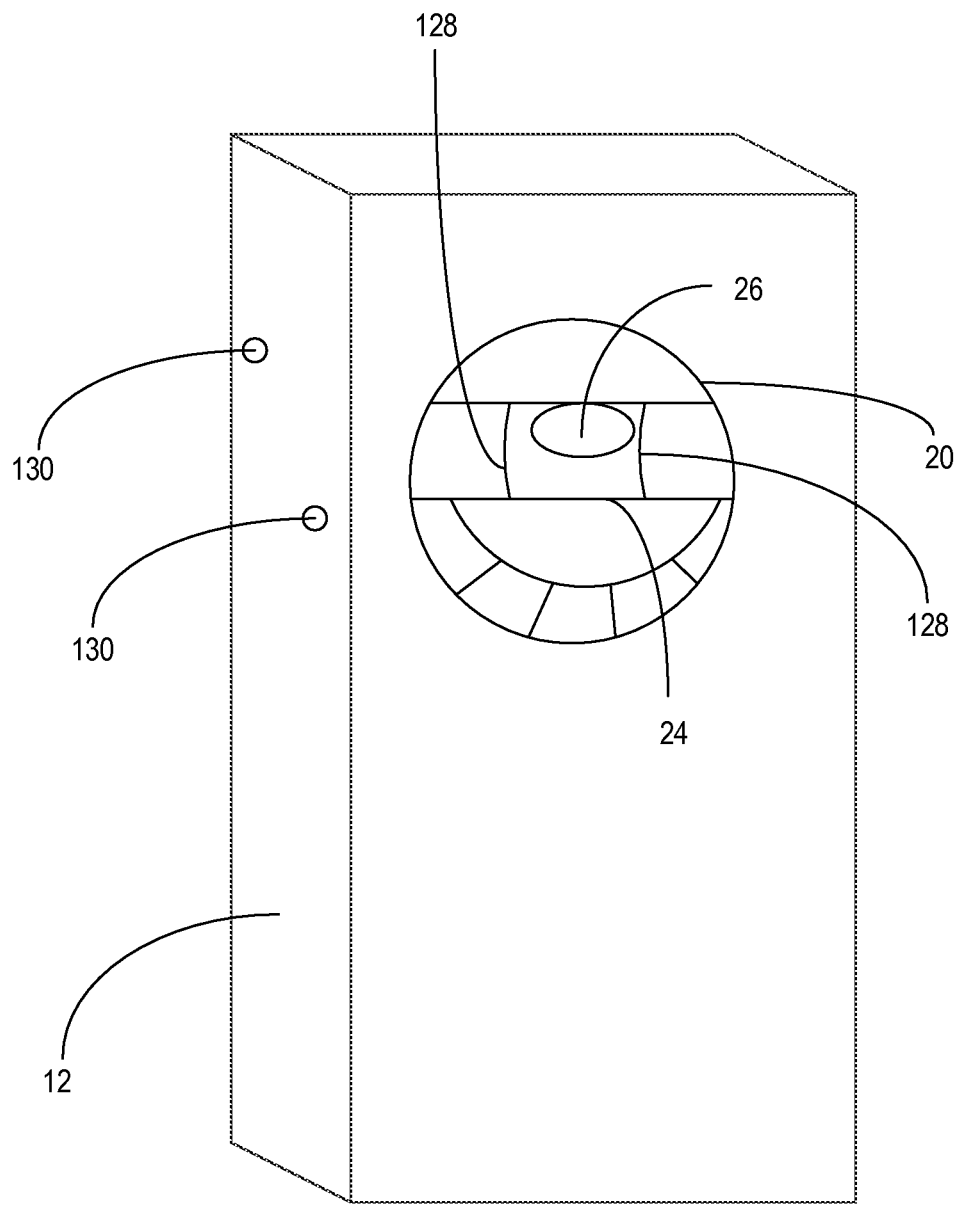
FIG. 10 illustrates a close-up view of the end of the member with an adjustment mechanism for the glass tube according to an exemplary embodiment of the present invention.

Referring to FIG. 10, a close-up view of the end of the member 12 illustrates an adjustment mechanism for the glass tube 24 according to an exemplary embodiment of the present invention. As described herein, the glass tube 24 includes vertical guide lines 128 for visually determining when the spirit 26 is in a level position, i.e., between the vertical guide lines. It may be required to adjust the position of the glass tube 24 within the opening 20 of the member 12. Accordingly, the glass tube 24 can be held in place within the opening 20 through four adjustable screws 130. FIG. 10 illustrates two screws 130 on one side of the member 12 and another two screws 130 are located on the opposite side (not shown). Specifically, each of the screws 130 can be adjusted to provide positioning of the glass tube 24 within the opening 20. This can be utilized to calibrate the device 10.

Figure 11:
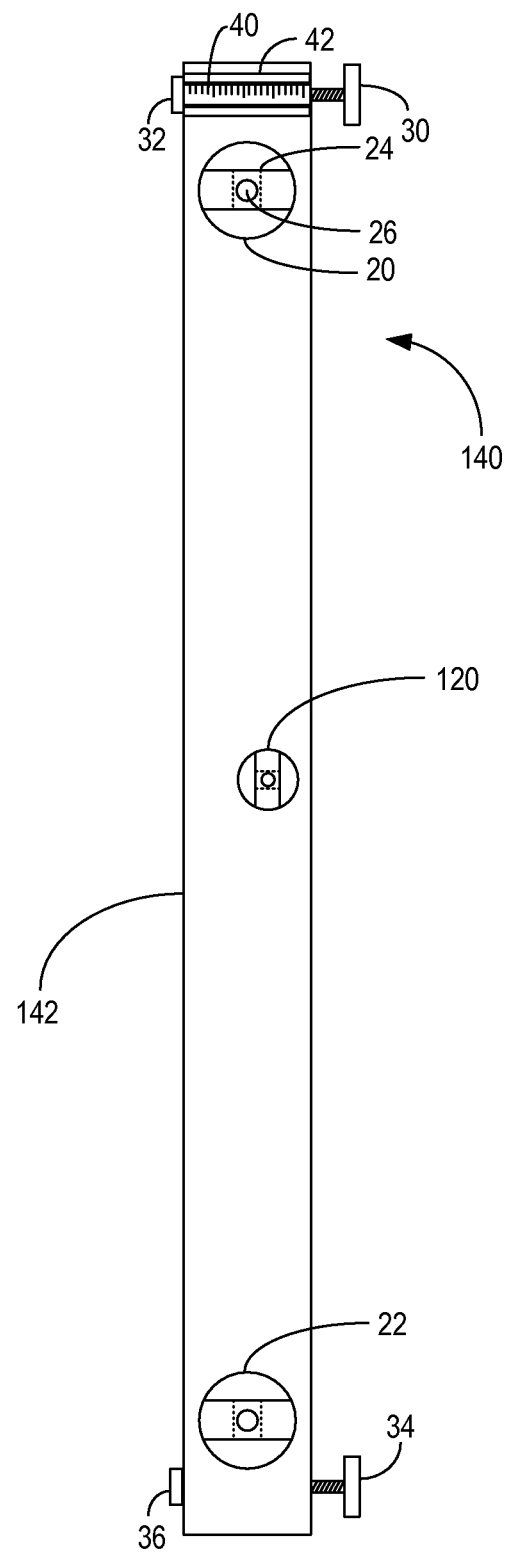
FIG. 11 illustrates an extendable plumb and level measuring device with a single elongated member according to an exemplary embodiment of the present invention.

Referring to FIG. 11, an extendable plumb and level measuring device 140 is illustrated with a single elongated member 142, according to an exemplary embodiment of the present invention. The extendable plumb and level measuring device 140 operates similarly to the extendable plumb and level measuring device 10, however the extendable plumb and level measuring device 140 includes the single elongated member 142 instead of the three interconnected members 12, 14, 16. Accordingly, the extendable plumb and level measuring device 140 is not extendable.

Figure 12:
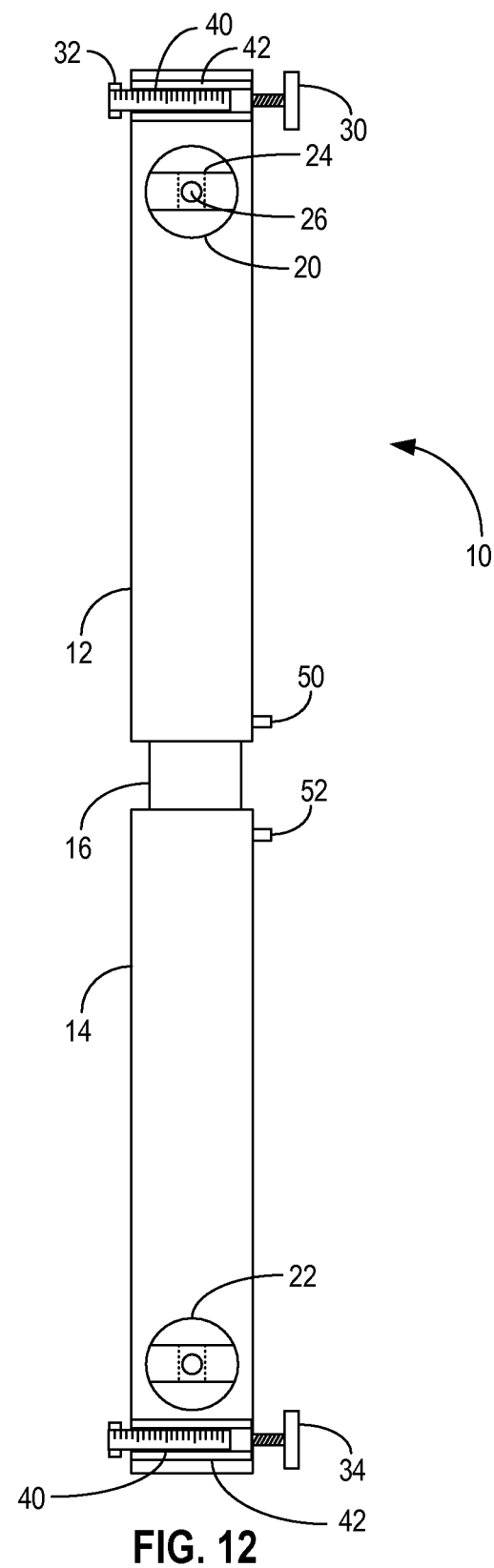
FIG. 12 illustrates the extendable plumb and level measuring device of FIG. 1 with a second measuring device disposed on one end of the second member according to an exemplary embodiment of the present invention.

Referring to FIG. 12, the extendable plumb and level measuring device 10 is illustrated with a second measuring device 40 disposed on one end of the second member 14, according to an exemplary embodiment of the present invention. The second measuring device 40 includes guide rails 42 and the second handle 34 is connected to another stopper. Accordingly, the second measuring device 40 can be used to measure plumb at the member 14.

Figure 13:
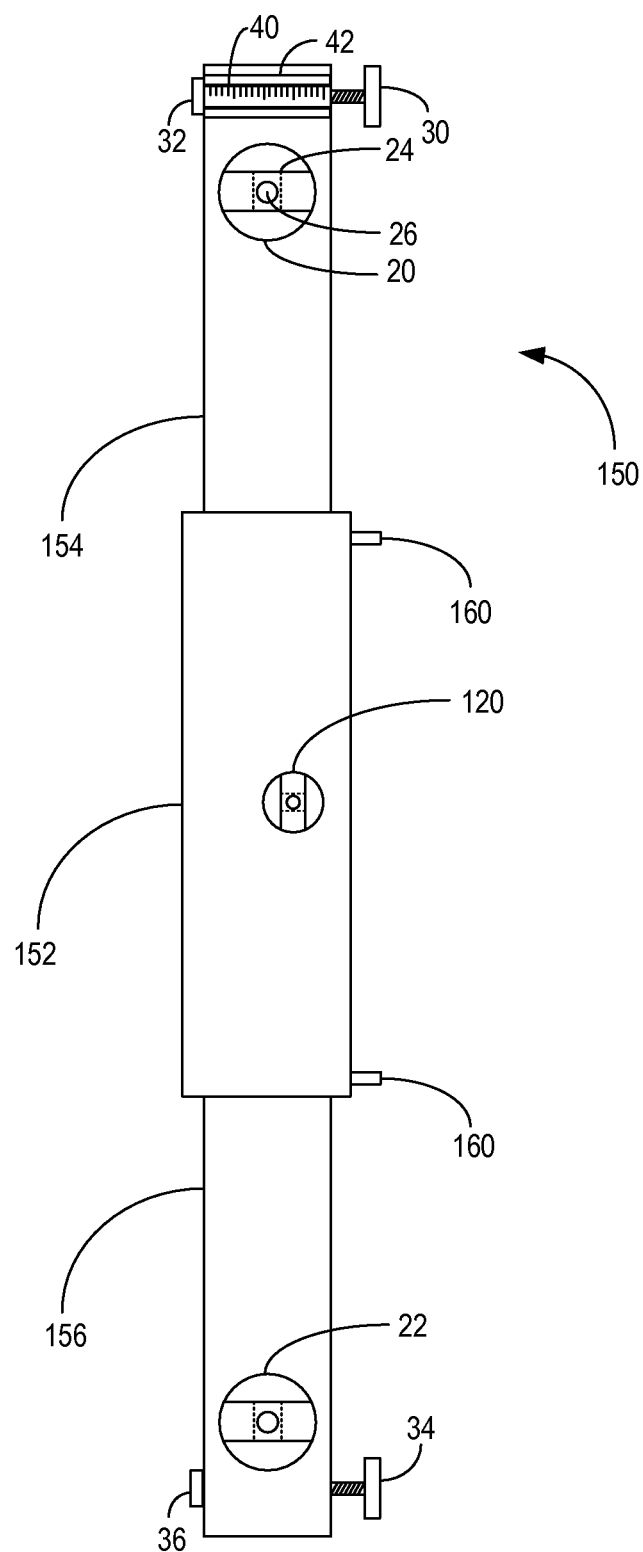
FIG. 13 illustrates an extendable plumb and level measuring device with a middle member, a first extendable member, and a second extendable member according to an exemplary embodiment of the present invention.

Referring to FIG. 13, an extendable plumb and level measuring device 150 is illustrated with a middle member 152, a first extendable member 154, and a second extendable member 156, according to an exemplary embodiment of the present invention. Here, the first member 154 and the second member 156 are slidingly disposed to the middle member 152. The extendable plumb and level measuring device 150 operates similarly to the extendable plumb and level measuring device 10 except the members 154, 156 slid from within the middle member 152. The middle member 152 includes pins 160 for selectively securing the members 154, 156 in a desired position for a desired length.

Figure 14A:
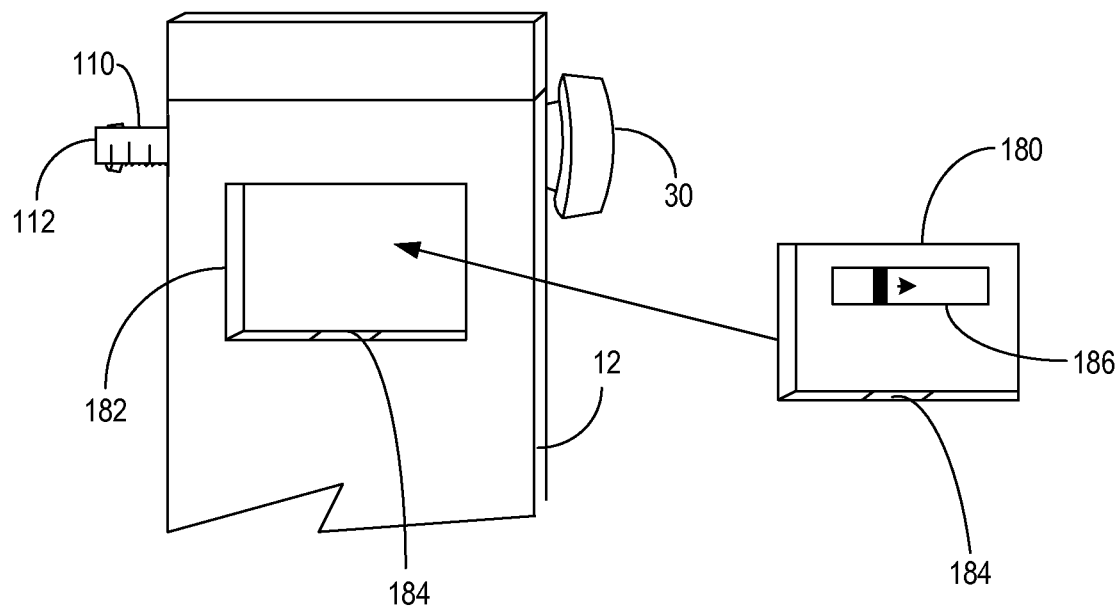
FIGS. 14a and 14b illustrate a removable digital level for measuring level according to an exemplary embodiment of the present invention.
Figure 14B:
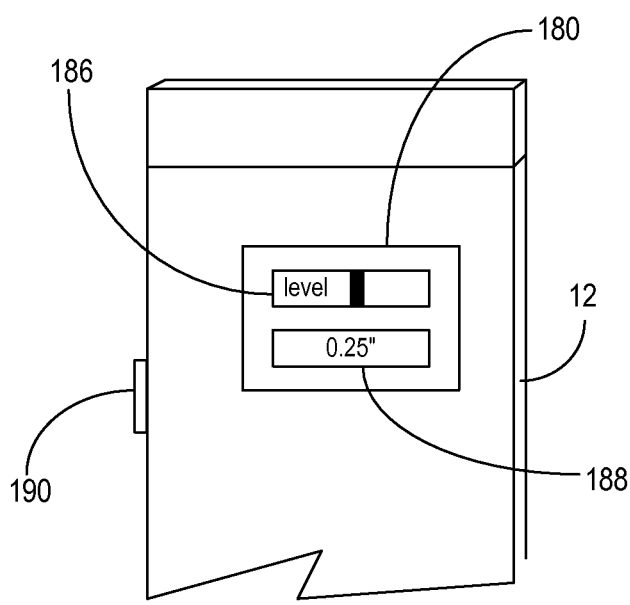

Referring to FIGS. 14a and 14b, a removable digital level 180 can be utilized for measuring level according to an exemplary embodiment of the present invention. FIG. 14a illustrates the digital level 180 removed from an opening 182 in the first member 12. For example, the digital level 180 can be secured within the first member 12 with a magnet 184, a clip, Velcro, or the like. The digital level 180 includes a screen 186 which can provide a level reading. For example, the screen 186 can include light emitting diodes (LEDs) or the like.

FIG. 14b illustrates the digital level 180 disposed within the opening 182 of the first member 12. Additionally, the digital level 180 can further include a distance measuring mechanism and a second screen 188 operable to display a distance measurement. Further, the digital level 180 can include control buttons (not shown) for operating the digital level 180. The distance measuring mechanism can include a laser, a sound-based, or the like measurement mechanism which takes the place of the measuring device 112. For example, a light or sound can be emitted from the digital level 180 through an opening 190 in the first member 12 to provide the distance measurement.

Figure 15:
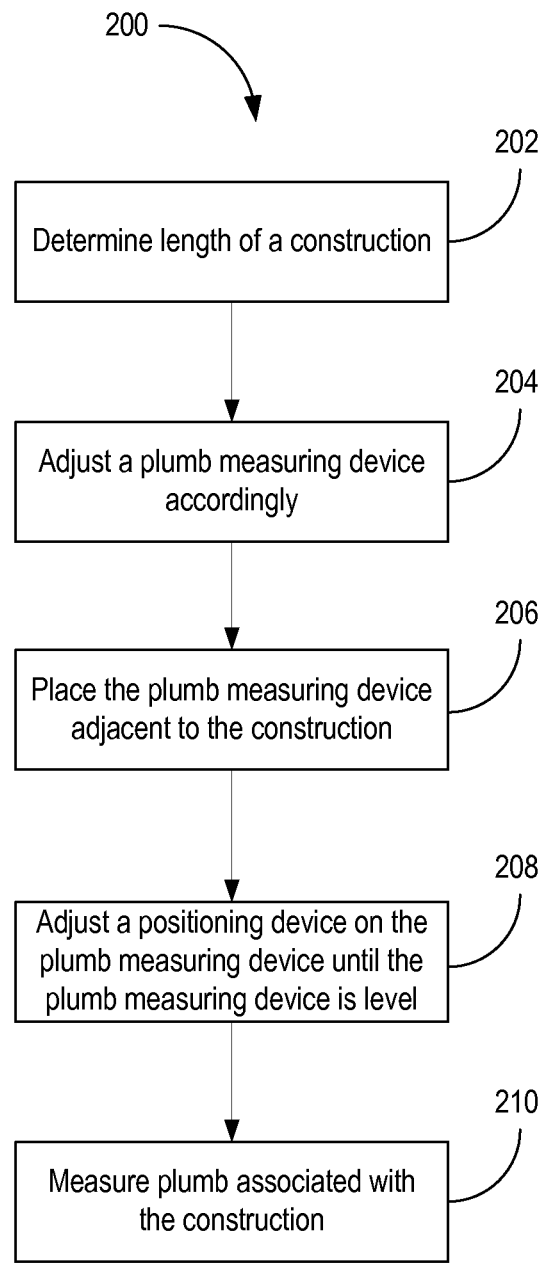
FIG. 15 illustrates a flowchart of a plumb measuring mechanism according to an exemplary embodiment of the present invention.

Referring to FIG. 15, a flowchart illustrates a plumb measuring mechanism 200 according to an exemplary embodiment of the present invention. The plumb measuring mechanism 200 can be utilized to determine an amount of plumb on a variable length construction, such as a wall, door, etc. For example, the plumb measuring mechanism 200 can be utilized to measure plumb associated with bathroom or tile walls in order to cut a glass plate to precise dimensions.

The plumb measuring mechanism 200 starts with determining a length of the construction (step 202). The plumb measuring mechanism 200 utilizes a plumb measuring device as described herein to measure the plumb associated with the construction. The plumb measuring device is adjusted according to the length of the construction (step 204). For example, the adjustment can include sliding one or more members to a desired length and securing the one or more members in place.

Next, the plumb measuring device is placed adjacent to the construction (step 206). The plumb measuring device, as described herein, can include an adjustable elongated member, a positioning device disposed at one end of the adjustable elongated member, wherein the positioning device is operable to angularly move the adjustable elongated member relative to an adjacent construction, and a calibratable level measuring device disposed at the one end operable to determine when the adjustable elongated member is level. The plumb measuring device can further include a distance measuring device coupled to the one end operable to measure plumb across a length on the construction. The distance extends from one end of the adjustable elongated member corresponding to a point on the adjacent construction relative to another end of the adjustable elongated member corresponding to a second point on the adjacent construction.

Once positioned, a positioning device on the plumb measuring device is adjusted until the measuring device is level (step 208). The positioning device is operable to angularly move the adjustable elongated member relative to an adjacent construction. The positioning device can include a stopper movably disposed within the adjustable elongated member and adjustment means to move the stopper to move the adjustable elongated member away from the adjacent construction such that the adjustable elongated member is level. For example, the adjustment means can include a handle connected to a threaded rod through the adjustable elongated member and a stopper connected to another end of the thread rod. The threaded rod rotates through the adjustable elongated member to move the stopper to create an angle between the adjustable elongated member and the adjacent construction.

Finally, the plumb associated with the construction is measured (step 210). Once the plumb measuring device is level, a distance measurement is taken which corresponds to the plumb of the construction. The distance measurement can be taken with a ruler, a digital level, or the like. The distance measurement measures the distance from the plumb measuring device (which is level) to the construction (which is plumb).

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A plumb measuring method, comprising:
   determining an arbitrary length of a vertical construction comprising a glass panel in which plumb is being measured;
   extending a plumb measuring device responsive to the length;
   placing a positioning device integrated within the plumb measuring device against the vertical construction, wherein the plumb measuring device is disposed substantially vertically against the vertical construction;
   adjusting the positioning device at a first member until a level measuring device indicates level; and
   reading a measurement on a measuring device coupled to the positioning device to determine an amount of plumb associated with the vertical construction, wherein the reading provides the measurement without requiring additional calculations to determine the amount of plumb between the arbitrary length of the construction, wherein the arbitrary length comprises any two points selected on the construction and a line formed therebetween; and
   cutting a glass plate responsive to the measured plumb to within $\frac{1}{32}^{nd}$ of an inch to prevent open space upon installation of the glass panel due to the measured plumb.

2. The plumb measuring method of claim 1, wherein the extending step comprises:
   extending a sliding member slidingly disposed within the first member and a second member; and
   securing the sliding member in a desired position.

3. The plumb measuring method of claim 1, wherein the adjusting step comprises:
   rotating a handle to move a stopper disposed to a threaded rod disposed to the handle to move the plumb measuring device at an angle relative to the construction; and
   continuing the rotating step until the device is level.

4. The plumb measuring method of claim 1, further comprising:
   calibrating the level measuring device relative to the plumb measuring device.

5. An extendable plumb and level measuring system, comprising:
   slidingly interconnected elongated members comprising a first member, a second member, and a third member;
   an adjustable positioning device at one end of the first member and integrated within the first member, the adjustable positioning device comprising a handle and a stopper;
   a level measuring device disposed at the one end of the first member;
   a measuring device disposed at the one end of the first member and configured measure an amount of plumb between arbitrarily defined points based on positioning and sliding of the first member, the second member, and the third member without requiring additional calculations;
   a construction adapted to receive a glass panel, wherein the arbitrarily defined points are on the construction, wherein the glass panel is cut responsive to the measured plumb to within $\frac{1}{32}^{nd}$ of an inch to prevent open space upon installation of the glass panel in the construction due to the measured plumb.

6. The extendable plumb and level measuring system of claim 5, further comprising:
   a securing mechanism disposed within the slidingly interconnect members to fixedly secure the first member, the second member, and the third member in a desired position;
   wherein the third member is slidingly disposed within the first member and the second member.

7. The extendable plumb and level measuring system of claim 5, wherein the handle is attached to a threaded rod and the threaded rod is attached to the stopper;
   wherein the threaded rod is disposed through the first member.

8. The extendable plumb and level measuring system of claim 7, wherein the handle and the threaded rod comprises a telescopic configuration such that the handle does not move outward from the first member responsive to rotating the threaded rod, and wherein the threaded rod is disposed through the first member with the handle disposed to one end of the threaded rod and the stopper disposed to the other end of the threaded rod.

9. The extendable plumb and level measuring system of claim 5, wherein the level measuring device comprising a spirit bubble in a glass tube comprising vertical guide lines; and
   wherein the glass tube is calibratable within the first member through a plurality of adjustable screws.

10. The extendable plumb and level measuring system of claim 5, wherein the level measuring device comprises a digital level;
   wherein the digital level is removable from the first member.

11. The extendable plumb and level measuring system of claim 5, wherein the measuring device comprises a ruler slidingly disposed in the one end of the first member, the ruler configured to slidingly extend from the first member and provide a direct measurement of the amount of plumb.

12. The extendable plumb and level measuring system of claim 5, wherein each of the first member and the second member comprise a plurality of holes.

13. The extendable plumb and level measuring system of claim 5, further comprising:
   a second level measuring device disposed within the third member, wherein the second level measuring device is utilized to measure level of a construction.

* * * * *